United States Patent [19]

Russell

[11] 3,815,189
[45] June 11, 1974

[54] CUTTING OR ABRADING ELEMENTS
[75] Inventor: Edward David Russell, Rotherham, England
[73] Assignee: Stanley Tools Limited, Woodside, Sheffield, England
[22] Filed: July 24, 1972
[21] Appl. No.: 274,665

[30]     Foreign Application Priority Data
         July 23, 1971   Great Britain................... 34621/71

[52] U.S. Cl..................................... 29/78, 76/101
[51] Int. Cl...................... B23d 71/00, B21k 21/00
[58] Field of Search.............. 29/78, 79; 76/101, 24

[56]             References Cited
                UNITED STATES PATENTS
1,727,690   9/1929   Anheuser............................... 29/78
2,058,912   10/1936  Reid...................................... 29/78
2,622,310   12/1952  Luchsinger........................... 29/78
2,678,571   5/1954   Booth................................ 76/101 S
2,703,119   3/1955   Pullen.................................. 29/78
2,984,892   5/1961   Oxford et al......................... 29/78
3,509,611   5/1970   Kifer..................................... 29/78

FOREIGN PATENTS OR APPLICATIONS
584,480    10/1959    Canada............................ 76/101 S

*Primary Examiner*—Harrison L. Hinson
*Attorney, Agent, or Firm*—Prutzman, Hayes, Kalb & Chilton

[57]            ABSTRACT

A cutting and abrading element of sheet metal has a multiplicity of apertures in arcuate rows with several spaced-apart apertures in each row, the concave side of each row facing the direction of cut, trailing edges of the apertures protruding to form cutting edges. In one embodiment, the circle centres of the arcuate rows are on the longitudinal axis of the element and the space between each pair of apertures in each row is directly behind an aperture in an immediately preceding row and/or directly in front of an aperture in an immediately following row.

7 Claims, 10 Drawing Figures

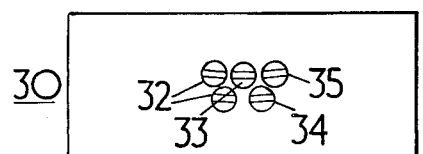
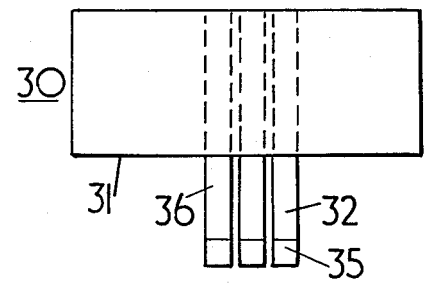
FIG.4A.   FIG.4B.
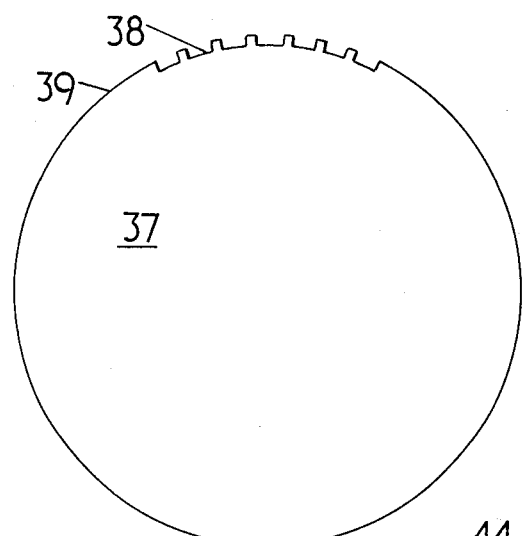
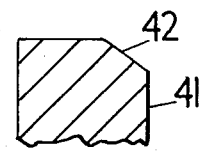
FIG.5.   FIG.7.
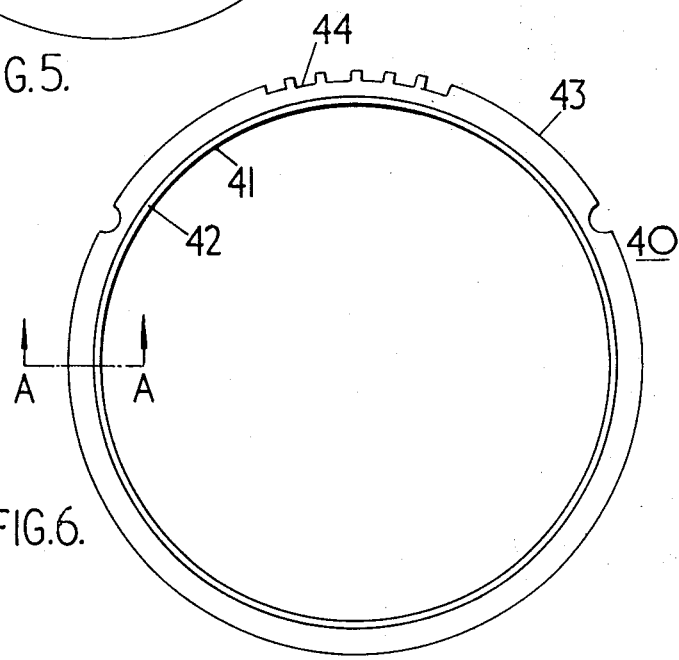
FIG.6.

CUTTING OR ABRADING ELEMENTS

BACKGROUND OF THE INVENTION

This invention relates to cutting and abrading elements of sheet material for cutting and abrading workpieces.

Known cutting and abrading elements of sheet material, having a multiplicity of apertures and a corresponding multiplicity of cutting or abrading teeth, are good for cutting metals but tend to become clogged when used for cutting and abrading some of the modern synthetic plastics materials. Moreover they are comparatively expensive to manufacture, requiring complex tooling. Furthermore, in one particular mode of use, smoothing off the ends of pipes, the cutting teeth tend to be damaged.

SUMMARY OF THE INVENTION

According to the invention here is provided a cutting or abrading element of sheet material for cutting or abrading a workpiece, said element comprising a multiplicity of mutually spaced apart apertures therethrough, said element also comprising a corresponding multiplicity of mutually spaced apart cutting teeth each adjacent a trailing edge of a respective associated one of said apertures, each tooth and each associated aperture being small in relation both to the width and to the length of said element, characterised in that the orientation of the teeth changes progressively from one part of the blade to another part of the blade.

In an embodiment of the invention, given by way of example, the associated apertures and cutting teeth are arranged in rows extending across the element from adjacent one side to adjacent an opposite side of the element. In the said embodiment, the rows are curved so that each row is concave to the front, each row defining an arc of a respective circle and each tooth being oriented so as to be substantially tangential to the respective arc.

In the said embodiment, the rows stop short of the two sides, (although this is not essential), to leave border regions without teeth and associated apertures. The phrases "adjacent one side" and "adjacent an opposite side" should be construed accordingly.

In the said embodiment, the centre of said circle lies on a longitudinal axis of the element and the teeth are oriented to extend substantially transversely to the longitudinal axis of the element in a middle region (which includes said axis) of the element and are oriented to extend at angles to said axis in side regions of the element such that the outer end of each tooth is further forward than its inner end in said side regions.

In the said embodiment, the teeth and associated apertures overlap laterally of the elements so that each space between adjacent cutting teeth and associated apertures is immediately in front of another cutting tooth and associated aperture and/or is immediately behind another cutting tooth and associated aperture.

Preferably each tooth and associated aperture is produced by means of a punch and die, the die face having an aperture to receive the punch and a chamfer along one edge of the die aperture so that the punch is forming the aperture pushes the tooth into the chamfer so that the tooth project from a face of the element before the punch and die together shear a blank from the element so as to form the tooth.

The element may be flat or curved transversely or curved longitudinally.

The element is flat or curved transversely may have longitudinal edge portions which are folded, to have a stiffening effect at an angle of between 45° and 270° to a non-cutting face of the element if the element is flat or to the chord of the arc of the element (on the concave side) if the element is curved transversely.

BRIEF DESCRIPTION OF DRAWINGS

FIGS. 4A and 4B, referred to collectively as FIG. 4, are an underneath plan view and a side elevation of a punch assembly used in making the element;

FIG. 5 is a plan view of a centre die used in making the element;

FIG. 6 is a plan view of an inner ring used in making the element;

FIG. 7 is an enlarged section on line A—A in FIG. 6; and

DESCRIPTION OF THE PREFERRED EMBODIMENT

Figure 1:
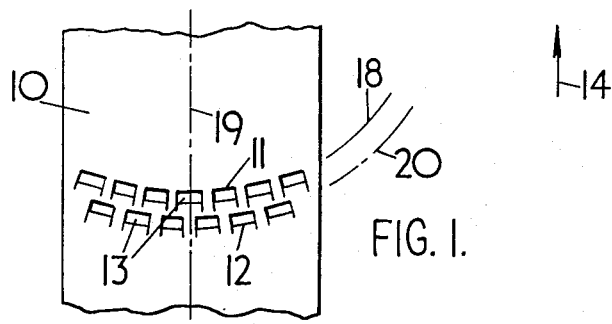
FIG. 1 is a plan view of part of a blank of sheet metal being formed into a cutting or abrading element forming the above-mentioned embodiment of the invention.

Referring to FIG. 1, there is shown a blank 10 of sheet metal of 0.020 inch thickness. The blank 10 is shown as having a pair of rows 11 and 12 of apertures 13 therein arranged so that one row 12 is behind the other row 11 in relation to a "forward" direction along the element, which is substantially a direction of cut of the element, indicated by an arrow 14. There are seven apertures 13 spaced apart from each other in row 11 and six apertures 13 spaced apart from each other in row 12. Each aperture 13 is 0.162 inch wide by 0.0715 inch long. There is a gap of 0.0715 inch between adjacent apertures in each row 11, 12.

Figure 2:
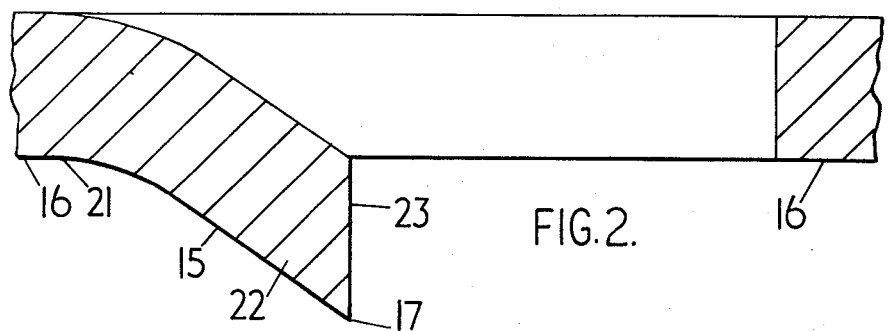
FIG. 2 is an enlarged fragmentary section through one aperture and surrounding parts of the blank in FIG. 1.

Referring to FIG. 2, (in which the direction left-to-right corresponds to arrow 14 in FIG. 1), a portion 15 of the blank protrude from a surface 16 of the blank 10, adjacent a trailing edge of the associated aperture, to form a cutting or abrading tooth with a cutting edge 17. The portion 15 is along a trailing edge of the respective aperture 13 in relation to the forward direction of the element. Each row 11 and 12 is curved, as shown in FIG. 1, in such a direction that each row 11, 12 is concave to the front, that is, in the forward direction indicated by arrow 14. More particularly, the centre-line 18 of row 11 in an arc of a circle of radius 1.722 inches centered on the longitudinal axis 19 of blank 10, whilst the centre-line 20 of row 12 is an arc of a concentric circle of radius 1.878 inches, also centered on the axis 19. Referring to FIG. 2, portion 15 measures about 0.041 horizontally from where it starts to bend at 21, with a radius of 0.020 inch, to cutting edge 17, and has a straight portion 22 measuring about 0.026 inch from the cutting edge 17 at an angle of between 32° and 35°, to the horizontal, forming a positive clearance angle of 32° to 35° to a horizontal surface of a workpiece (not shown) being cut or abraded. The face 23 is either vertical or positively raked at an angle of up to 5°.

Further pairs of rows of apertures, not shown, identical to the rows 11 and 12 are formed behind the rows 11 and 12, with a uniform pitch of 0.156 inch between adjacent rows along the centre-line 19 of blank 10. The centres of the cutting edges 17 of apertures 13 of row 11 are "offset" by 0.1167 inch from the centres of cutting edges 17 of apertures 13 of row 12, so that each space between adjacent "side-by-side" cutting teeth and associated apertures is (except for the rearmost row) immediately in front of another cutting tooth and associated aperture and is also (except for the foremost row) immediately behind another cutting tooth and associated aperture.

Of course, it will be appreciated that any or all of the above-mentioned dimensions and angles may be changed. However, they have been found to give satisfactory results.

Figure 3A:
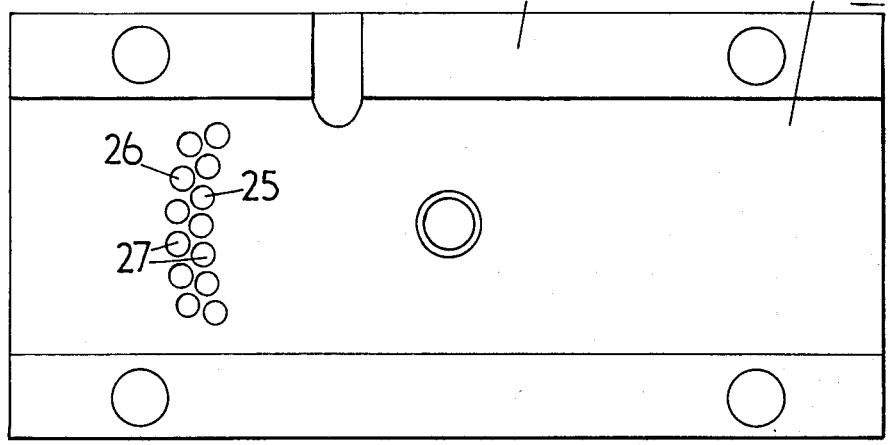
FIGS. 3A and 3B, referred to collectively as FIG. 3, are a plan view and a side elevation of a stripper plate used in making the element.
Figure 3B:
Figure 8:
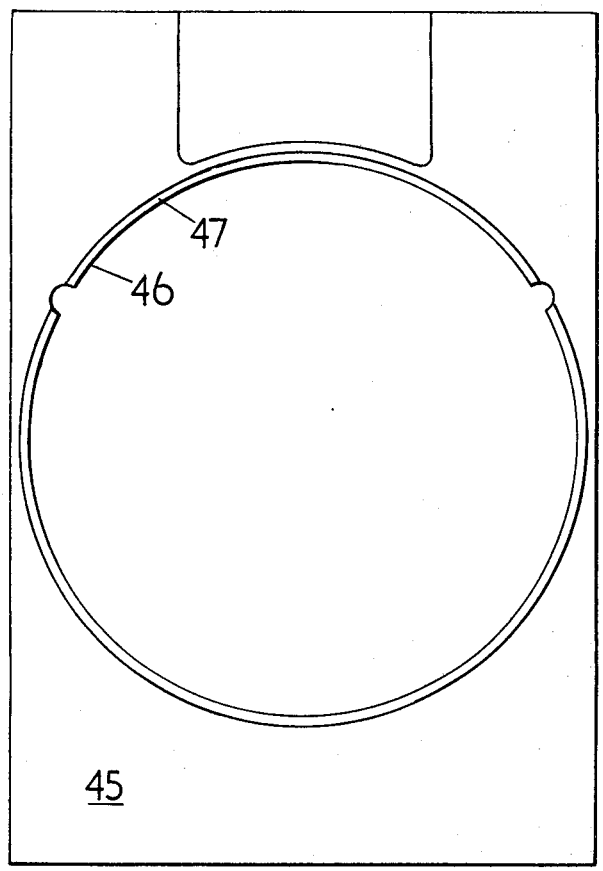
FIG. 8 is a plan view of an outer die used in making the element.

Referring now to FIGS. 3 to 8, the stripper plate 24 shown in FIGS. 3A and 3B has two rows 25 and 26 of holes 27 the centres of which are on arcs of concentric circles of the same radii, 1.722 inches and 1.878 inches, as the circles on which the rows 11 and 12 of apertures 13 lie. The holes 27 are spaced apart by the same distance centre-to-centre as apertures 13. The stripper plate 24 also has a channel 28, 0.125 inch deep and 1.750 inches wide between side flanges 29, to accommodate the blank 10.

The punch assembly 30 shown in FIGS. 4A and 4B comprises a base 31 on which thirteen punches 32 are mounted in two rows 33 and 34 of seven punches 32 and six punches 32 respectively with spacings between the punches 32 equal to the spacings between the holes 27 of stripper plate 24 (and corresponding to the spacings between apertures 13 of blank 10). End portions 35 of the punches 32 have rectangular cross-sections corresponding to the cross-sections of apertures 13. Rearward portions 36 of the punches 32 have cross-sections corresponding to the cross-sections of the holes 27. In use, the punch assembly 30 is located above the stripper plate 24 and the blank 10 is located in channel 28 of the stripper plate 24. The punches 32 extend through the holes 27 into engagement with the blank 10 and are withdrawn from the holes 27, (or at least withdrawn until the tips of punches 32 are flush with the underside of plate 24 so that the plate 24 strips the blank off the punches 32 should it have adhered by friction thereto).

The centre die 37 shown in FIG. 5 has seven notches 38 in its (otherwise circular) peripheral edge 39. The die 37 is of 3.504 inches outside diameter and fits inside the inner ring 40 shown in FIG. 6 so that the notches 38 co-operate with the inside peripheral edge 41 of ring 40 to define seven apertures corresponding in dimensions and spacings to the seven apertures 13 in row 11. An inside edge portion 42 of ring 40 is bevelled as shown in FIG. 7 to cause portions 15 of blank 10 in row 11 to protrude from surface 16. The bevel is at an angle of 35° and measures 0.025 inch radially horizontal. The ring 40 has an outside circular edge 43 of 3.817 inch diameter with six notches 44 therein. The ring 36 fits inside the outer disc 45 shown in FIG. 7 so that the notches 44 co-operate with the inside peripheral edge 46 of die 45 to define six apertures corresponding in dimensions and spacings to the six apertures 13 in row 12. An edge portion 47 of the die 45 is bevelled in the same way as edge portion 42 of ring 40 to cause portions 15 of blank 10 to protrude from surface 16 in row 12.

In operation, the punch assembly 30 is located above stripper plate 24, the inner ring 40 is located inside the outer die 45, the centre die is located inside the ring 40. The ring 40 and the dies 37 and 45 are supported so that their upper surfaces are flush with each other and in contact with flange 29 of stripper plate 24. The blank 10 is then fed through the channel 28 and the punch assembly 30 is operated repeatedly to produce pairs of rows 11 and 12 of apertures 13 in the blank 10, the blank 10 being advanced 0.312 inch between successive operations of the punching assembly 30. When the blank 10 is "full" of rows of apertures, it is chopped into lengths, each of which is to form a cutting or abrading element in accordance with the invention. If necessary, further forming operations may now be carried out upon each length to adapt it to form part of or be incorporated in a cutting or abrading tool.

The lengths are then heat-hardened in known manner.

Grinding is not believed to be necessary, since the shearing of the blank 10 involved in the production of the apertures 13 produces the positive clearance angle of 32° to 35° and the face 23 of 0° to 5° positive rake.

When a cutting or abrading element produced from the blank 10 is used, it is moved across a surface of a workpiece (not shown) in the direction of arrow 14 or a direction at a small angle thereto and pressed against the workpiece.

The arrangement of the apertures 13 and cutting edge portions 15 facilitates the cutting or abrading action, the break-up of chippings and their removal apertures 13 from he workpiece. The cutting edges 17 are flat and produce a smooth surface on the workpiece. Furthermore, the portions 15 with stand considerable usage.

The above-described and illustrated element is comparatively inexpensive to manufacture, the tools required being of simple forms. The element cuts or abrades both metals and plastics well, with good chip clearance in the case of plastics.

MODIFICATIONS

Cutting and abrading elements in accordance with the invention may be flat as described above or may be transversely or longitudinally curved, as mentioned in the Summary. They may alternatively be cylindrical, that is, of circular cross-section, or of U-shaped cross-section or three-sides-of-a-rectangle (including a square) cross-section or of V-shaped cross-section, for various cutting and abrading tasks.

CROSS-REFERENCE TO CO-PENDING PATENT APPLICATION

A cutting or abrading element of sheet material having assymmetrical or offset arcuate rows of apertures and associated cutting teeth is described and claimed in a co-pending patent application Ser. No. 274,666 of even date filed jointly by myself and George William Ronald Shelton and assigned to the same assignees. That cutting and abrading element produces a different cutting or abrading effect on one side than an opposite side.

I claim:

1. A cutting and abrading blade of sheet material having a forward end and adapted for stabilized linear movement over a workpiece in a direction generally toward said forward end, said blade comprising a multiplicity of individual spaced-apart apertures and a multiplicity of associated cutting teeth forming the trailing edges of said apertures, said teeth having substantially straight working edges, the apertures and associated teeth being arranged in arcuate rows extending across said sheet material, each row defining an arc and being comprised of a plurality of said individual apertures and associated teeth to effect discrete multiple chip removal of material by each row of teeth, said rows being generally concave relative to the said forward end, the orientation of the teeth within each row progressively changing across the sheet material so that said substantially straight edges are substantially tangential to their respective arc and a majority thereof operate at least partly in shear irrespective of the particular forward linear movement employed.

2. The cutting and abrading blade of claim 1 wherein the apertures and associated teeth in each row are staggered relative the apertures and associated teeth in each immediately adjacent row.

3. The cutting and abrading blade of claim 1 wherein each row defines an arc of a respective circle.

4. The cutting and abrading blade of claim 3 wherein the center of said circle lies on the longitudinal axis of the blade.

5. The cutting and abrading blade of claim 1 wherein the apertures and associated teeth adjacent the ends of each row are closer to said forward end than at least a portion of the remaining apertures and associated teeth within the same row.

6. The cutting and abrading blade of claim 1 wherein the teeth include working edges oriented to extend substantially perpendicularly to the longitudinal axis of the blade extending between said forward and rearward ends within a region immediately adjacent said axis and are oriented to extend at acute angles to said axis in regions on opposite sides of said middle region such that the outermost end of the working edge of each tooth in said side regions is further forward relative to the axis than the corresponding innermost end.

7. The cutting and abrading blade of claim 1 wherein the teeth and associated apertures are arranged so that each space between adjacent teeth and associated apertures in one row is behind another tooth and associated aperture in the immediately preceding row.

* * * * *